Patented Sept. 25, 1934

1,974,747

UNITED STATES PATENT OFFICE 1,974,747

MANUFACTURE OF ARSENIC ACID

James N. Latimer, Grand Junction, Colo., assignor to The Latimer-Goodwin Chemical Company, Grand Junction, Colo., a corporation of Colorado No Drawing. Application March 9, 1932, Serial No. 597,811

5 Claims. (Cl. 23—144)

When arsenious oxide is added to nitric acid, arsenic acid and nitric oxide gas are formed. The latter may be conducted to absorption towers where it is mixed with water and oxygen and converted to nitric acid to be then re-used in the process. Employing materials of reasonable purity, there is a tendency for the reaction to lag short of completeness. In accordance with the present invention however, it now becomes possible to not only carry such reaction to a satisfactory completeness and usage of the raw materials, but also attain a highly advantageous rate of reaction speed.

To the accomplishment of the foregoing and related ends, the invention, then, comprises the features hereinafter fully described, the following description setting out in detail certain illustrative embodiments of the invention, these being indicative however, of but a few of the various ways in which the principle of the invention may be employed.

In proceeding in accordance with the invention, arsenious oxide is treated with nitric acid in the presence of a catalyst. The catalyst is advantageously a halogen material. While a halogen salt such as sodium or potassium iodide or chloride may be employed, the halogens as such, iodine, chlorine, etc., and particularly iodine, are advisable. The amount of the catalyst need not be over 0.10 per cent, and in general is desirably less, or within the practical range of 0.002-0.02 per cent. While I have found that all of the halogens provide a catalytic action, the activity of iodine is surprisingly greater than that of others. For instance, chlorine in a proportion of 1 part to 260,000 parts by weight of reaction solution is effective, while on a corresponding basis, bromine is effective in proportion of 1 part to 590,000 parts, fluorine in proportion of 1 part to 1,600,000 parts, and iodine in proportion of 1 part to 2,400,000 parts. Furthermore, I have found that operating with iodine obviates tendencies to corrosion of customarily available metallic condenser equipment.

It is desirable to suitably raise the temperature of the reaction materials, and the temperature most feasible in a given case varies somewhat with the strength of acid employed. The stronger the acid the lower the temperature may be when feeding of the arsenious oxide thereto is begun. With the nitric acid initially charged into a reaction container, such as a ceramic jug having a water-jacket or bath, the temperature of the acid may be raised above 100° F. up to about 160° F. The usual temperature range at which feeding of the arsenious oxide to the nitric acid begins, may be about 140–160° F.

The catalyst can be added as such to the mixture in the reaction chamber, or as preliminarily dissolved in a small amount of water. Pure iodine is so sparingly soluble in water that it is impracticable to make up a solution thereof directly, but by employing potassium iodide also, ready solution is facilitated.

As an example: Nitric acid of 32–35° Bé. is charged into a large earthenware jug-like reaction chamber, and the temperature is brought to about 130° F. by the heating jacket or the like. Arsenious oxide is progressively added, the ultimate total being brought to substantially molecular proportions, in accordance with the equation $$3As_2O_3 + 4HNO_3 + 7H_2O = 6H_3AsO_4 + 4NO.$$ 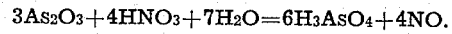

The catalyst is added, comprising 25 cc. of a solution which has a concentration of 17.4 gr. of iodine and 34.8 gr. of potassium iodide per 1,000 cc. of water, this providing iodine at the rate of about 1.1 gr. per 500 gallons of reaction solution. By adding the catalyst after the reaction has proceeded, and begins to slow down, the advantageous practical effects are attained, and without premature loss of the iodine through vaporization from the reaction mixture. When feeding of arsenic has ended, steam is turned into the reaction mixture and kept on until all chemical action has ceased. The steam increases the temperature to 210–230° F., depending upon steam pressure employed. After sampling shows the arsenic acid to be nearly free from nitric acid, the steam is shut off, and the charge may be blown with air to clear out last traces of nitric acid.

Other modes of applying the principle of the invention may be applied, change being made as regards the details described, provided the steps stated in any of the following claims, or the equivalent of such, be employed.

I therefore particularly point out and distinctly claim as my invention:—

1. A process of making arsenic acid, which comprises reacting between arsenious oxide and nitric acid in the presence of an iodine catalyst.

2. A process of making arsenic acid, which comprises supplying an iodine catalyst, and subjecting arsenious oxide to the action of such catalyst and nitric acid.

3. A process of making arsenic acid, which comprises supplying sodium iodide in catalytic amount, and subjecting arsenious oxide to the action of such catalyst and nitric acid.

4. A process of making arsenic acid, which comprises supplying iodine in amount of about 1.1 gr. per 500 gallons of reaction solution, and subjecting arsenious oxide to the action of such catalyst and nitric acid.

5. A process of making arsenic acid, which comprises supplying iodine and an iodide, and subjecting arsenious oxide to the action thereof and nitric acid.

JAMES N. LATIMER.